Figure 1:
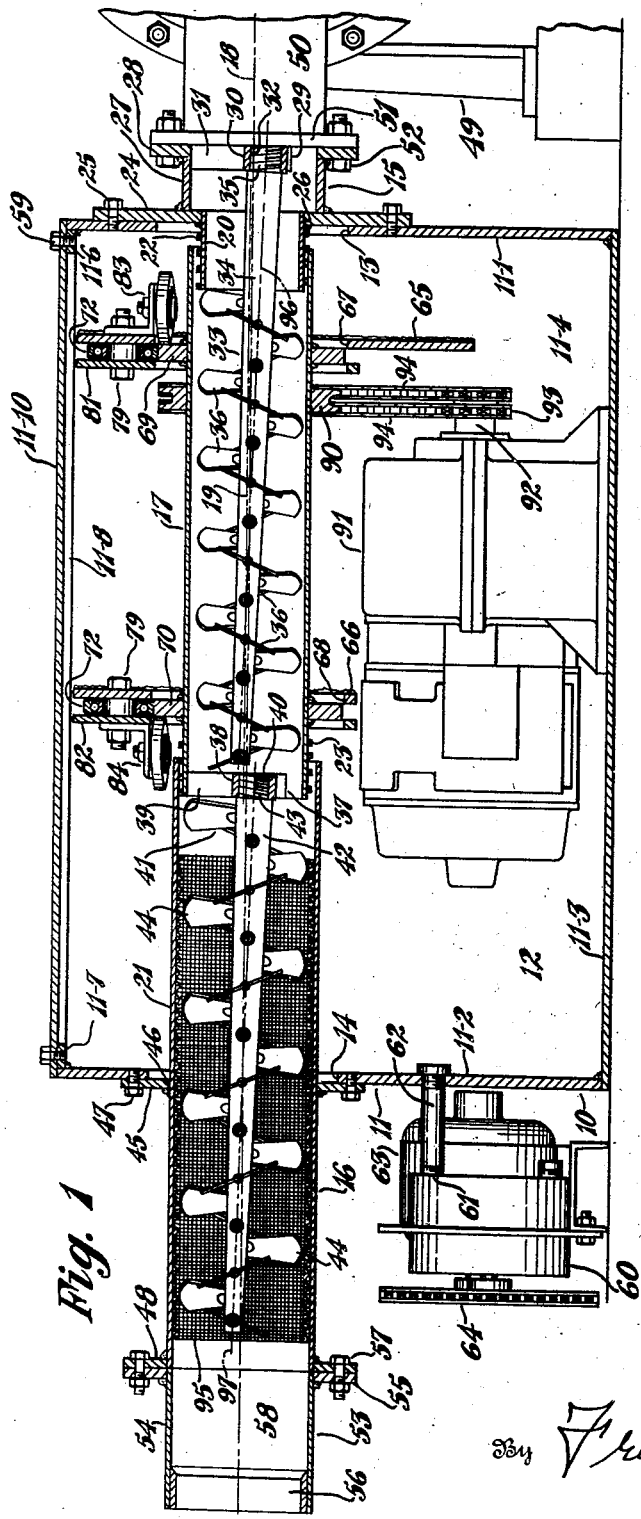

Nov. 2, 1943.                    E. A. HAWK                    2,333,565
        METHOD AND APPARATUS FOR PRESSURE TREATMENT OF MATERIALS
                     FOR CHANGING THE GAS CONTENT THEREOF
                  Filed Aug. 3, 1940            3 Sheets-Sheet 1

Inventor
Elwin A. Hawk
By Frease and Bishop
Attorneys

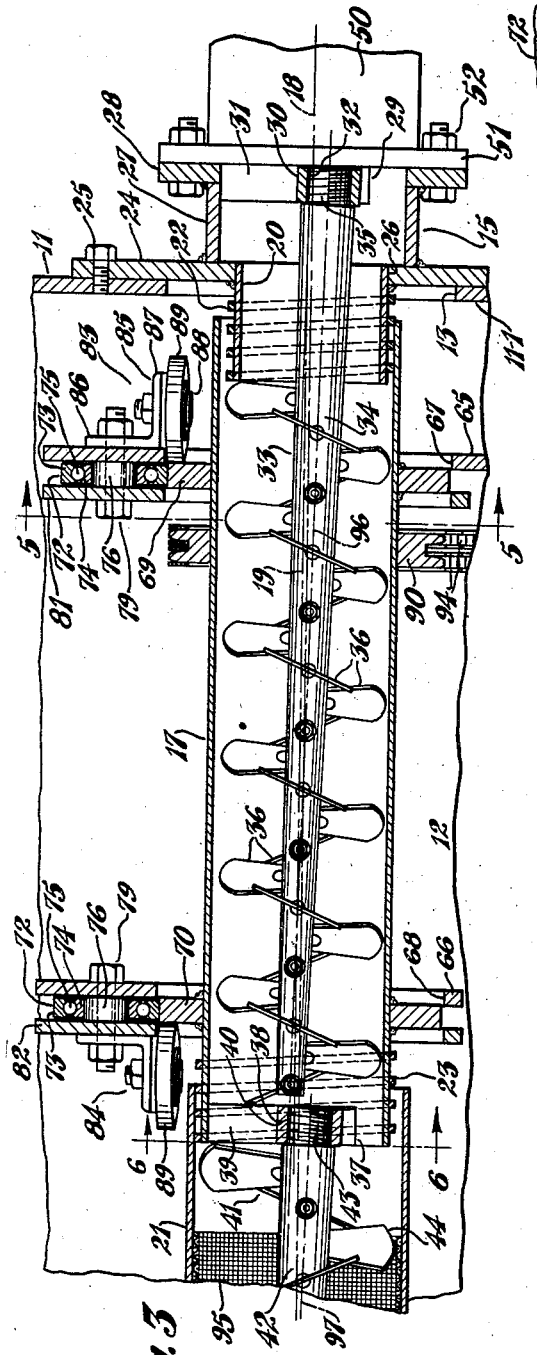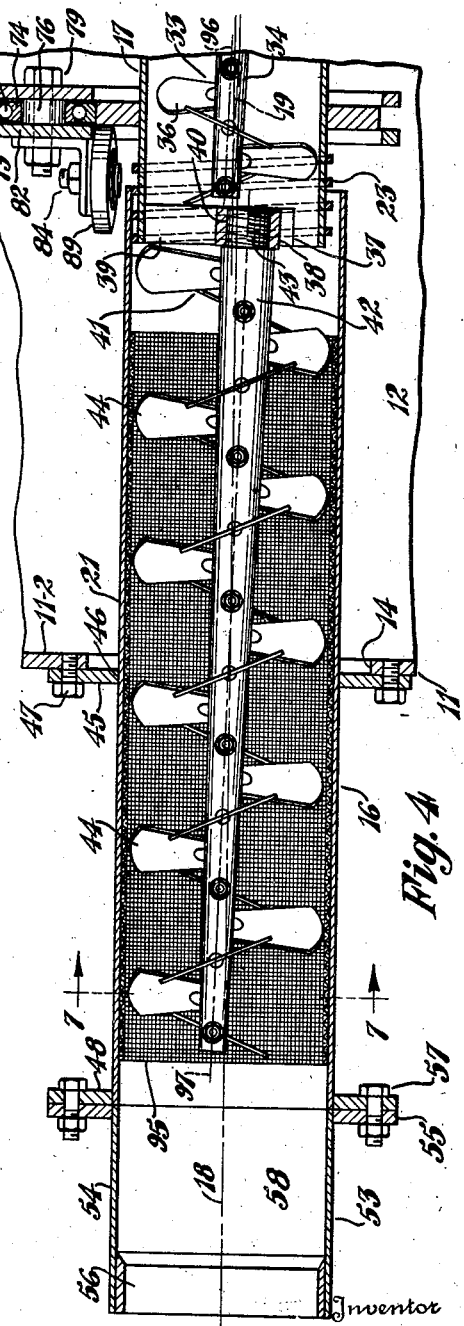

Nov. 2, 1943.                      E. A. HAWK                         2,333,565
         METHOD AND APPARATUS FOR PRESSURE TREATMENT OF MATERIALS
                    FOR CHANGING THE GAS CONTENT THEREOF
                           Filed Aug. 3, 1940              3 Sheets-Sheet 3

Inventor
Elwin A. Hawk
By Frease and Bishop
Attorneys

Patented Nov. 2, 1943

2,333,565

UNITED STATES PATENT OFFICE 2,333,565

METHOD AND APPARATUS FOR PRESSURE TREATMENT OF MATERIALS FOR CHANGING THE GAS CONTENT THEREOF

Elwin A. Hawk, Canton, Ohio

Application August 3, 1940, Serial No. 350,676

33 Claims. (Cl. 25—14)

My discovery and invention relates to methods and apparatus for pressure treatment of materials particularly for changing the gas content thereof, and particularly material which prior to and usually after treatment has been and is subject to the usual varying atmospheric conditions of the particular locations of the material prior to and after the treatment.

The discovery and invention is more particularly adapted for the pressure treatment of plastic materials such as green ceramic materials which may include clays, shales, and mixtures of the same used in the manufacture of heavy ceramic articles such as brick and tile, and ceramic mixtures such as are used in the manufacture of vitreous and semi-vitreous tableware, and ceramic mixtures such as are used in the manufacture of porcelain, such as insulators.

Other materials which may be advantageously treated by the methods and apparatus of the discovery and invention include plastics of all sorts, soaps, petroleum products, wall paper cleaner, and the like.

The methods and apparatus of the discovery and invention are not however limited for use in the treatment of any particular material or for any plastic or non-plastic or other condition of the same, but are adapted for use generally in changing the gas content of materials and thereby changing their physical characteristics, and also for otherwise changing the condition or characteristics of material.

In the pressure treatment of materials, particularly plastic green ceramic materials, the subjecting of comminuted green ceramic mixtures to a sub-atmospheric pressure in a gas sealed stationary chamber and simultaneously pumping away the low pressure atmosphere in the chamber, has been practiced for many years in various forms of apparatus commonly known as de-airing apparatus.

A measure of the efficiency of any particular de-airing apparatus which is convenient is the relative plasticity of the de-aired green material. That is to say the greater the plasticity with respect to tension, compression, or torsion without rupture, the more completely de-aired, de-gassed, or homogenized the treated material has become.

The present discovery and invention includes improvements applicable to the methods and apparatus of my prior application for United States Letters Patent, Serial No. 164,551, and also applicable to other methods and apparatus for changing the gas content of material, such as those commonly known as de-airing methods and apparatus.

I have discovered by experiment that the most effective reduction in the gas content of material may be attained either directly in a stationary gas sealed chamber as is usual in the art, or in a pressure treatment rotary tube operating in a stationary gas sealed chamber as set forth in my prior application for United States Letters Patent Serial No. 164,551 and herein, when the material occupies only about 10% of the total free volume of the chamber or tube.

In a usual de-airing apparatus having a stationary de-airing chamber, it is common for the material to back up and ultimately clog the entire volume of the de-airing chamber, necessitating frequent cleaning out of the de-airing chamber.

I have discovered that there is a tendency in the usual discharge screw press conveyor means of de-airing apparatus to make seams or folds in the discharge column of green plastic material by the re-entrapment of residual gas content which may remain in the material after passing either directly through the gas sealed de-airing chamber, or through a pressure treatment rotary tube operating therein.

The objects of the present improvements include in general the provision of improved methods, method steps, and apparatus for pressure treatment of materials for changing the gas content thereof and the like, and by which the gas content of any particular material may be more completely and efficiently changed than by usual methods, method steps and apparatus.

Further objects of the present improvements include in particular the provision of improvements in the methods, method steps, and apparatus set forth in my said prior application for United States Letters Patent, Serial No. 164,511.

Further objects of the present improvements include the provision of improved methods, method steps, and apparatus for pressure treatment of materials particularly for changing the gas content thereof, and by which may be controlled the relative volume of pieces of material occupying the free volume of the preferred pressure treatment rotating tube to be as low as about 10% of the total free volume of the tube.

Further objects of the present improvements include the provision of improved screw press conveyor means particularly adapted for discharging material from a gas sealed pressure treatment chamber, and in which the material passing through and being compressed in the screw press conveyor means may be subject to a desired controlled moving mass of preferably sub-atmospheric pressure gas.

Further objects of the present improvements include the provision of improved apparatus for the pressure treatment of material, the apparatus being adapted for easy and rapid disassembly, particularly for facilitating the making of repairs and the changing of parts.

Further objects of the present improvements include the provision of improved apparatus for the gas pressure treatment of material, the apparatus having a gas treating chamber in which the material moves and is subject to a gas having a density and thus pressure or a constituency different than the atmosphere, and the gas treating chamber being provided with improved means for preventing plugging thereof by the material moving therein.

Further objects of the present improvements include the provision of improved methods, method steps, and apparatus for reducing the gas content of material, and which, in the case of plastic material, have relatively high efficiencies, that is produce homogenized plastic material of relatively great plasticity, when subject to tension, compression, bending, or twisting forces, or combinations of such forces.

Further objects of the present improvements include the provision of improved general and detail constructions and arrangements of certain parts of the apparatus.

The foregoing and other objects are attained by the methods, method steps, apparatus, parts, combinations, and sub-combinations of the present discovery and invention, and the nature of which is set forth in the following general statement, and preferred embodiments of which are set forth in the following description, and which are particularly and distinctly pointed out and set forth in the appended claims forming part hereof, or in claims which may originate herein.

The nature of the improved methods and method steps of the present discovery and invention may be stated in general terms as including in the pressure treatment of materials for changing the gas content thereof and the like, the method steps including introducing pieces of the material in a gas sealed chamber, causing the pieces of material to arrange themselves in an elongated preferably eccentrically rotating tubular formation whose length is preferably substantially greater than its diameter as by centrifugal pressure against the inner surface of an eccentrically rotating tube, simultaneously moving the elongated tubular formation of the pieces of material lengthwise of themselves whereby the successive applications of the centrifugal pressures tend to reduce one or more dimensions of the pieces of material as by flattening and breaking, and simultaneously moving a mass of gas in the gas sealed chamber in contact with the inner tubular face of the tubular formation of pieces of material so that the gas content of the pieces of material is changed to the extent that substantially all of the voids of the material have a gas density approaching the gas density of the gas sealed chamber.

Preferably in the case of green ceramic materials and the like, the pieces of material are introduced into the gas sealed chamber and into the tubular formation from an elongated sealing column having an elongated bore formed in the incoming end thereof; and the pieces of material are discharged from the chamber preferably by forming therefrom an elongated sealing column having an elongated bore in its inner end exposed to the gas in the chamber.

The nature of the improved apparatus of the present invention may be stated in general terms as including in apparatus for the pressure treatment of materials for changing the gas content thereof and the like, walls forming a gas sealed chamber having an intake opening and a discharge opening, and means associated with the intake opening and the discharge opening for sealing the interior of the chamber from the atmosphere about the exterior thereof, which may be termed an initial atmosphere.

A pressure treatment tube is operatively mounted for rotation preferably about a longitudinal eccentric axis within the gas sealed chamber. An intake tube preferably extends from the intake opening of the chamber towards one end of the pressure treatment tube, and a discharge tube preferably extends from the discharge opening of the chamber towards the pressure treatment tube.

Adjacent ends of the treatment tube and the intake tube preferably telescope with each other, and adjacent ends of the treatment tube and the discharge tube preferably telescope with each other. Means are provided operative between the telescoped tube ends for preventing the escape of pieces of material from the tubes into the chamber and the clogging of the space between the telescoped tube ends.

Feed screw means, preferably feed screw blades on a stationary tapered shaft, extend from the intake tube lengthwise through the rotating pressure treatment tube, and feed screw means preferably feed screw blades on a tapered shaft extend from and rotate with the discharge end of the pressure treatment tube into the discharge tube.

The intake end of each screw shaft is preferably offset from the axis of rotation of the rotating tube, and the longitudinal axis of each feed screw shaft is preferably angled with respect to the axis of rotation, and the discharge end of each feed screw shaft is preferably offset from the axis of rotation.

On the intake side of the intake feed screw, walls form a plug seal compartment which may be connected with a usual pug mill and the like.

On the discharge side of the discharge feed screw shaft, walls form a compression chamber and a discharge die.

Means are provided for controlling the gas density and pressure of the gas sealed chamber and for moving the gas mass therein as by a vacuum pump or pressure pump.

The apparatus furthermore includes improved general and detail arrangements of certain parts, as hereinafter set forth and claimed.

Figure 2:
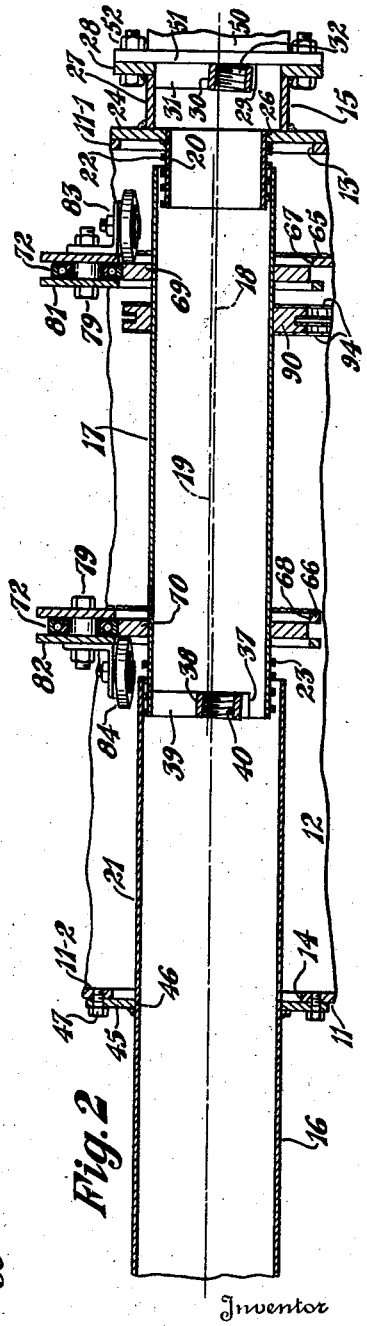
Figure 5:
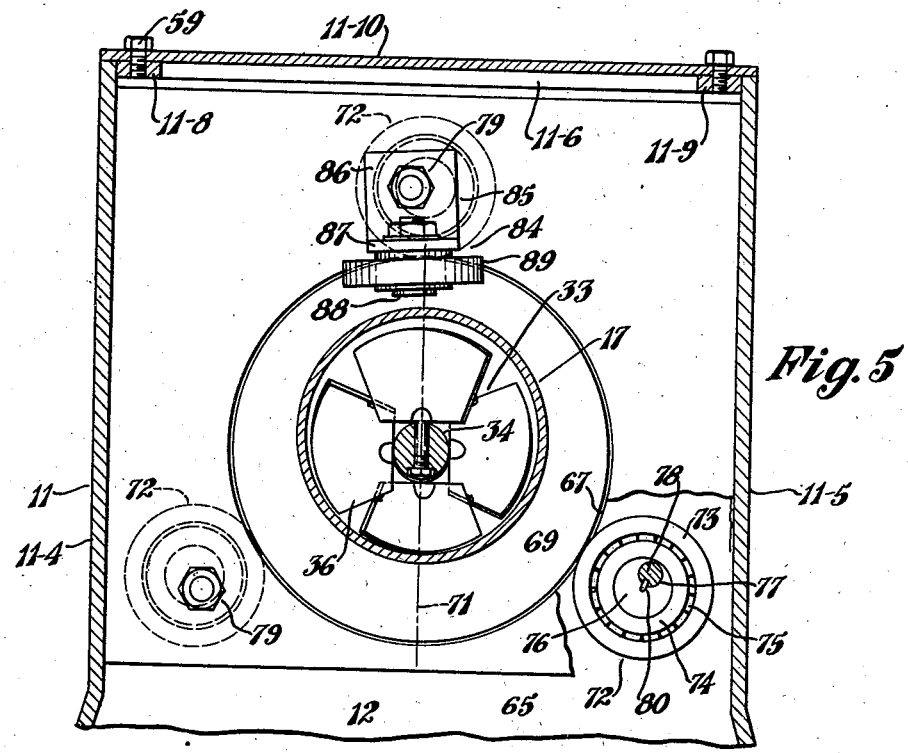
Figure 6:
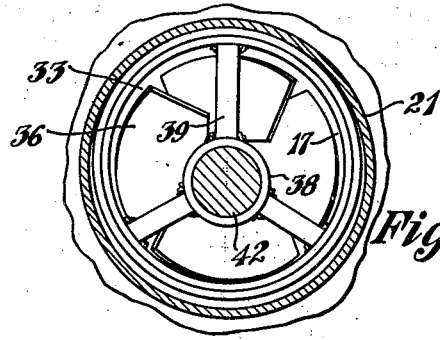
Figure 7:
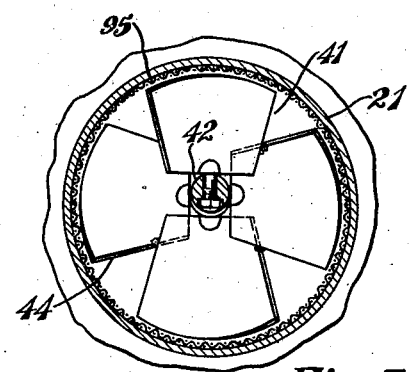
Figure 8:
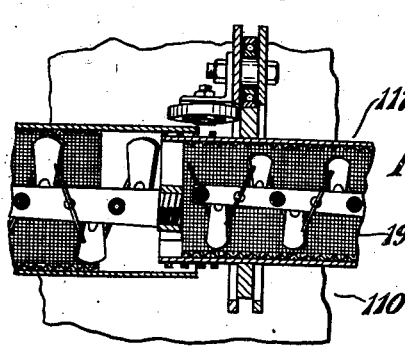

By way of example, several embodiments of the improved apparatus and parts hereof adapted for carrying out the improved methods and method steps hereof are illustrated in the accompanying drawings forming part hereof, in which Figure 1 is a vertical longitudinal sectional view of one embodiment of the improved apparatus hereof, on the axis of rotation of its rotary pressure treatment tube;

Fig. 2, a fragmentary view, similar to Fig. 1, with the stationary and rotary feed screws removed and the preferred screen tube lining of the discharge tube removed, for more clearly illustrating the arrangements with each other of the intake tube, the rotary and preferably eccentric pressure treatment tube, the discharge tube, and associated parts;

Fig. 3, an enlarged fragmentary view similar to Fig. 1, showing more clearly the details and arrangements with each other of the intake tube, the rotary pressure treatment tube, portions of the discharge tube, and certain associated parts;

Fig. 4, an enlarged fragmentary view similar to Fig. 1, showing more clearly the details and arrangements with each other of portions of the rotary pressure treatment tube, the discharge tube, and certain associated parts;

Fig. 5, an enlarged fragmentary transverse sectional view, as on line 5—5, Fig 3;

Fig. 6, an enlarged fragmentary transverse sectional view, as on line 6—6, Fig. 3;

Fig. 7, an enlarged fragmentary transverse sectional view, as on line 7—7, Fig. 4; and Fig. 8, a fragmentary view, similar to Fig. 1, showing a second embodiment of the improved apparatus hereof.

Similar numerals refer to similar parts throughout the drawings.

One embodiment of the improved apparatus hereof is illustrated in Figs. 1 to 7 inclusive and indicated generally by 10, and includes walls indicated generally by 11 which form a chamber 12 having an intake opening 13 and a discharge opening 14, and sealing means indicated generally by 15 are associated with the intake opening 13, and sealing means indicated generally by 16 are associated with the discharge opening 14, and all other joints of the walls 11 of the chamber 12 are gas sealed, and the chamber 12 is thus a gas sealed chamber.

For certain purposes of the present improvements, the chamber 12 has a substantial length, which may be, in an apparatus designed for use in a commercial semi-porcelain pottery manufacturing plant, upwards of six feet long. At the same time, the chamber 12 has a substantial volume, which is attained when the length of the chamber is upwards of six feet by making the height of the chamber 12 upwards of three feet and the width upwards of three feet.

Within the gas sealed chamber 12, a pressure treatment tube indicated generally by 17 is mounted for rotation about an axis indicated by the dot-dash line 18 which preferably and as shown is a horizontal axis.

The pressure treatment tube 17 is preferably as shown cylindric, and its length is preferably substantially greater than its diameter. For example, for an apparatus for use in a commercial semi-porcelain pottery manufacturing plant, the diameter of the pressure treatment tube 17 may be upwards of one foot, and its length may be upwards of three feet.

For certain purposes of the present improvements, the longitudinal center axis of the tube 17 indicated by the dot-dash line 19 is offset and parallel with the axis of rotation 18, and the tube 17 thus rotates about the eccentric axis 18 with respect to its own longitudinal center a-: - 19.

The chamber walls 11 as shown and preferably include opposite end walls 11—1 and 11—2. The intake opening 13 is formed in the end wall 11—1, and the discharge opening 14 is formed in the opposite end wall 11—2, and the intake and discharge openings 13 and 14 are opposite each other. The pressure treatment tube 17 extends between the opposite intake and discharge openings 13 and 14.

A preferably cylindric intake tube 20 preferably extends from the intake opening 13 of the chamber 12 towards the adjacent intake end of the pressure treatment tube 17, and a preferably cylindric discharge tube 21 preferably extends from the discharge opening 14 of the chamber 12 towards the adjacent discharge end of the pressure treatment tube 17.

Adjacent ends of the pressure treatment tube 17 and the intake tube 20 preferably telescope with each other, and as shown the diameter of the intake tube 20 is less than the diameter of the pressure tube 17, and the inner end of the intake tube 20 telescopes within the intake end of the pressure treatment tube 17, there being preferably as shown a clearance between the telescoping ends of the pressure treatment tube 17 and the intake tube 20.

Similarly, adjacent ends of the pressure treatment tube 17 and the discharge tube 21 telescope with each other, and as shown the discharge tube 21 has a greater diameter than the pressure treatment tube 17, and the inner end of the discharge tube 21, telescopes over the discharge end of the pressure treatment tube 17, there being preferably as shown a clearance between the telescoping ends of the pressure treatment tube 17 and the discharge tube 21.

Material blocking and clearing means are provided between each set of telescoped tube ends for preventing the escape of pieces of material from the tubes into the chamber 12 and the clogging of the clearance space between each set of telescoped tube ends.

As shown, the material blocking and clearing means between the telescoped ends of the intake tube 20 and the pressure treatment tube 17 includes a helix thread 22 on the external surface of the intake tube 20, the helix thread 22 extending from outside of the intake end of the pressure treatment tube 17 into the clearance space between the telescoped tube ends to the inner extremity of the intake tube 20.

The external helix thread 22 on the intake tube 20 is preferably square, and cooperates with the rotating eccentric tube 17 to form the material blocking and clearing means between the telescoped ends of the intake tube 20 and the pressure treatment tube 17.

Similarly, the material blocking and clearing means between the telescoped ends of the pressure treatment tube 17 and the discharge tube 21 as shown includes a helix thread 23 on the external surface of the discharge end of the pressure treatment tube 17, the helix thread 23 extending from outside of the inner end of the discharge tube 21 into the clearance space between the telescoped tube ends to the discharge end extremity of the pressure treatment tube 17.

The external helix thread 23 on the pressure treatment tube 17 is preferably square, and cooperates on the rotating eccentric tube 17 with the discharge tube 21 to form the material blocking and clearing means between the telescoped ends of the pressure treatment tube 17 and the discharge tube 21.

The intake tube 20 is preferably as shown part of the sealing means 15 for the intake opening 13, which furthermore includes an annular sealing plate 24 whose inner face overlaps the outer face of the chamber end wall 11—1 about the intake opening 13 formed therein, and the sealing plate 24 is seal clamped to the end wall 11—1 as by cap screws 25 extending through suitable apertures in the sealing plate and screwed into suitable threaded apertures in the end wall 11—1.

The annular sealing plate 24 has its central opening 26 fitted on and secured as by welding to the outer end of the intake tube 22. An enlarged web supporting and connecting tube 27, coaxial with the tube 20, has its inner end secured as by arc welding to the outer face of the annular plate 24, and upon the outer end of the tube 27 there is secured as by welding an outwardly extending intake connecting flange 28. Within the outer end of the tube 27 and within the flange 28 there is located a web indicated generally by 29, which includes preferably as shown a hub 30, preferably as shown eccentric with respect to the axis of rotation 18, and from which extend three radial web arms 31, the outer ends of which abut against and are secured to as by welding the inner cylindric surfaces of the tube 27 and flange 28.

The web 29 has its hub 30 provided with an internally threaded bore 32 and serves as a support for and a part of feed screw means indicated generally by 33 for the pressure treatment tube 17.

The feed screw means 33 furthermore includes a cantilever shaft 34 having a shouldered and externally threaded support end 35 screwed into the threaded bore of the hub 30 and extending therefrom longitudinally through the connecting and supporting tube 27 and the intake tube 22, and from the intake tube 22 into and through the pressure treatment tube 17 to a point within the discharge end thereof.

The screw shaft 34 is stationary, and is preferably tapered with its largest cross section at its supporting or intake end at the inside of the hub 30 of the supporting web 29. The feed screw means 33 furthermore include a plurality of feed screw blades 36 each having its inner end secured to the shaft 34 and extending radially outwardly therefrom towards the inner cylindric surface of the pressure treatment tube 17, and the blades 36 are also suitably angled with respect to each other to comprise helicoidal screw faces about the shaft 34.

Within the discharge end of the pressure treatment tube 17 and adjacent the discharge end of the feed screw shaft 34 there is located a web indicated generally by 37 including a hub 38, preferably as shown eccentric with respect to the axis of rotation 18, and from which extend a plurality of radial web arms 39, the outer ends of which abut against and are secured as by welding to the inner surface of the discharge end of the pressure treatment tube 17.

The web hub 38 is provided with an internally threaded bore 40 and serves as a support for and part of discharge tube feed screw means indicated generally by 41, which furthermore include a cantilever shaft 42 having a shouldered and externally threaded supporting end 43 screwed into the threaded bore 40 of the web hub 38.

The cantilever shaft 42 extends from its supporting end 43 carried by the web 37 in the discharge end of the rotating pressure treatment tube 17 into and through the discharge tube 21 to a point adjacent the discharge end thereof. The feed screw shaft 42 is tapered with its larger transverse cross-section at its intake end at the discharge side of the supporting web 37.

The discharge tube feed screw means 41 furthermore include a plurality of feed screw blades each indicated generally by 44 which are secured to the shaft 42 and arranged therewith and with each other in a manner similar to the arrangement of the screw blades 36 on and with the shaft 34 and with each other.

The helical direction of the screw blades 44 and the screw blades 36 are however opposite to each other, for obtaining feed in the same direction.

The discharge tube 21 has as shown a length which is preferably substantially greater than its diameter, and may be as shown substantially longer than the pressure treatment tube 17.

The discharge sealing means 16 are formed as shown in part by the discharge tube 21 which extends through the discharge opening 14 which the end wall 11—2 has formed therein, and the discharge sealing means 16 furthermore includes an annular sealing plate 45 having a central opening 46 which fits on and is secured to as by welding a central portion of the discharge tube 21. The inner face of the sealing plate 45 overlaps the outer face of the chamber end wall 11—2 about the discharge opening 14 therein, and the sealing plate 45 is seal clamped to the end wall 11—2 as by cap screws 47 extending through suitable apertures in the sealing plate and screwed into suitable threaded apertures in the end wall 11—2.

At the outer extremity of the discharge tube 21 beyond the outer face of the chamber end wall 11—2 there is located a discharge connecting flange 48 which is secured to the discharge tube 21 as by welding.

At the intake side of the apparatus 10 as shown there is located a pug mill indicated generally by 49, which may be a Bolton pug mill, commonly used in the semi-porcelain dinnerware industry, and includes a laterally directed discharge tube 50 having at its extremity a connecting flange 51 which is connected with the intake connecting flange 28 of the apparatus 10 as by a plurality of bolt and nut means each indicated generally by 52.

At the discharge end of the discharge tube 21, a plug seal and die unit indicated generally by 53 is located and includes as shown a tube 54 having fitted at one end thereof an annular connecting flange 55 which is secured to the tube 54 as by welding, and at the other end thereof an annular discharge die 56 which is fitted and secured as by welding within the inner surface of the tube 54.

The tube 54 is coaxial with and has the same diameter as the discharge tube 21 and the connecting flange 55 of the tube 54 abuts against the discharge connecting flange 48 of the apparatus 10 and is secured thereto as by bolt and nut means each indicated generally by 57. A discharge plug seal chamber 58 is formed between the discharge end of the screw shaft 42 and the die 56.

The chamber walls 11 furthermore include a bottom or base wall 11—3 and side walls 11—4 and 11—5. The end walls 11—2, the bottom walls 11—3, and the side walls 11—4 and 11—5 are secured to each other at their edge joints as by welding.

On the inside faces of the end walls 11—1 and 11—2 and of the side walls 11—4 and 11—5, at the top thereof, longitudinally and inwardly extending flange bars 11—6 and 11—7, and 11—8 and 11—9 are secured respectively as by welding, the top faces of the chamber side and end walls and the flange bars being flush with each other to form a sealing and clamping seat, and a removable top wall 11—10 overlaps the top faces of the flange bars and the side and end walls and is secured to the flange bars as by cap screws 59 extending through suitable apertures in the top wall 11—2 and screwed into suitable threaded apertures in the flange bars.

A vacuum or pressure pump is associated with the gas sealed chamber 12 to provide means for changing the pressure and gas content thereof, and as shown, a vacuum pump indicated generally by 60 is located externally of the gas sealed chamber 11 and has an intake 61 connected by a pipe 62 through the chamber end wall 11—2 with the gas sealed chamber 12. The vacuum pump 60 may be as shown driven by a motor indicated generally by 63 through a sprocket and gear connection indicated generally by 64 operative between the motor 63 and the vacuum pump 60.

Preferred and improved means for operatively mounting the preferred cylindric pressure treatment tube 17 for eccentric rotation with respect to its own longitudinal center axis 19 about the axis of rotation 18, as shown includes within the chamber 12, a transverse supporting wall 65 located between the intake tube 20 and the discharge tube 21 and adjacent the intake tube 20, and extends between the side walls 11—4 and 11—5 and has end faces abutting and secured to the side walls as by welding.

Another transverse supporting wall 66 within the chamber 12 is located between the intake tube 20 and the discharge tube 21 and adjacent the discharge tube 21, and extends between the side walls 11—4 and 11—5 and has end faces abutting and secured to the side walls as by welding.

The transverse supporting walls 65 and 66 have formed therein respectively central circular openings 67 and 68 of substantially greater diameter than the diameter of the pressure treatment tube 17 and the pressure treatment tube 17 extends through the transverse wall openings 67 and 68.

The transverse supporting walls 65 and 66 preferably as shown are flat walls of uniform thickness whose transverse faces are perpendicular with the axis of rotation 18.

The transverse supporting walls 65 and 66 are thus longitudinally spaced with respect to the axis of rotation 18, and the tube 17 has located thereon longitudinally spaced eccentric ring disk wheels 69 and 70 located respectively at the same sides of the transverse supporting walls 65 and 66.

Each of the eccentric ring disk wheels 69 and 70 has cylindric external peripheries of equal diameter as shown and whose center axes coincide with the axis of rotation 18.

Each of the eccentric ring disk wheels 69 and 70 has a central eccentric aperture therein which fits about the external cylindric surface of the pressure treatment tube 17, and the wheels 69 and 70 are secured to the tube 17 as by welding. The diameters of eccentricity of the two wheels 69 and 70 are parallel with each other, the diameter of eccentricity of the wheel 69 being indicated by the vertical dot-dash line 71 in Fig. 5, and the diameters of eccentricity of the wheels 69 and 70 lie in the sectional plane of Figs. 1, 2, 3, and 4.

The external circular diameters of the wheels 69 and 70 are slightly less than the diameters of the transverse supporting wall openings 67 and 68 for permitting longitudinal movement of the pressure treatment tube 17 and its wheels 69 and 70 through the openings 67 and 68 for assembly and disassembly.

For the same purposes, the intake and discharge openings 13 and 14 of the chamber end walls 11—1 and 11—2 respectively are preferably as shown circular and have diameters equal to the diameters of the transverse supporting wall openings 67 and 68.

Improved adjustable means for rotatably supporting the integral eccentric wheel mounted pressure treatment tube 17 on the supporting walls 65 and 66 include a plurality of ball bearings each indicated by 72 located about the circular external periphery of each wheel 69 and 70.

As best shown in Fig. 5, the external cylindric surface of the outer race ring 73 of each ball bearing 72 rolls against the external cylindric periphery of one of the wheels 69 or 70. Each ball bearing 72 furthermore includes in a usual manner, an inner race ring 74, and the outer and inner race rings 73 and 74 having oppositely opening race grooves formed therein in a usual manner and between which are located in a usual manner a plurality of balls 75.

Within the inner cylindric aperture of each ball bearing inner race ring 74, there is located an eccentric disk 76 having an outer cylindric surface fitting the inner cylindric surface of the particular inner race ring 74.

Each eccentric disk 76 has a cylindric aperture 77 formed therein, the center of which is eccentric with the cylindric external surface of each disk.

For each ball bearing 72 there is provided a cylindric aperture in one of the supporting walls 65 and 66 having the same diameter as its eccentric disk aperture 77. The aperture 77 of the eccentric disk 76 mounting each bearing 72 registers with one of the equal diameter apertures in one of the supporting walls 65 and 66, and each set of registering supporting wall and eccentric disk apertures has extending therethrough a supporting shank 78 which may be the shank of nut and bolt means indicated generally by 79. Each shank 78 is connected as by key and groove means 80 with its supported eccentric disk 76.

Each eccentric disk 76 and the roller bearing 72 carried thereby is located at one side of one of the supporting walls 65 and 66. Means are provided for clamping the several eccentric disks 76 and their supported roller bearing 72 on each of the supporting walls 65 and 66, which as shown includes for the supporting wall 65 a transverse clamping wall 81 having a central circular opening therein registering with the opening 67 of the wall 65 and through which the tube 17 extends.

The clamping wall 81 is spaced from the supporting wall 65 with the eccentric disks 76 and their roller bearings 72 roll supporting the wheel 69 located between the clamping wall 81 and the supporting wall 65.

The clamping wall 81 is provided with shank apertures registering with the shank apertures of the eccentric disk 76 and the supporting wall 65, and the shank 78 of each bolt and nut means 79 on the supporting wall 65 likewise passes through one of the apertures in the clamping wall 81 and serves to clamp its eccentric disk 76 against the supporting wall 65.

A similar clamping wall 82, provided with a central circular opening therewith registering with the opening 68 of the supporting wall 66 and through which the tube 17 extends, is associated in a similar manner with the eccentric disks 76, the roller bearings 72, and the bolt and nut means 79 carried by the supporting wall 66.

The thrust of the rotating tube 17 is in the direction of the discharge end of the machine and is counterbalanced by the thrust of the stationary discharge tube 21 and therefore thrust bearings are a small problem as compared to ordinary de-airing machines.

End thrust bearing means indicated generally by 83 are associated with the supporting wall 65 and the clamping wall 81 for absorbing the end thrust on one side of the wheel 69, and similar means indicated generally by 84 are associated with the supporting wall 66 and the clamping wall 82 for absorbing the end thrust on the opposite side of the wheel disk 70.

The end thrust bearing means 83 includes an angle bracket 85 having one leg 86 having an aperture formed therein which is supported on the shank of one of the bolt and nut means 79 and clamped against the face of the supporting wall 65 opposite the chamber end wall 11—1. The other leg 87 of the angle bracket 85 extends from the supporting wall 65 towards the end wall 11—1 and has formed therein an aperture which receives and supports the shank of a bolt and nut means 88, the shank of which serves as a bearing for the thrust roller 89 which rolls against the side face of the wheel 69 opposite the chamber end wall 11—1.

The end thrust bearing means 84 is of similar detail construction, with oppositely arranged parts, and the thrust roller 89 of the end thrust bearing means 84 rolls against the face of the wheel 70 opposite the chamber end wall 11—2.

Drive means for rotating the pressure treatment tube 17 as shown includes a double gear 90 having an eccentric opening which fits on the tube 17 to which the gear 90 is secured as by welding, and the gear 90 is located between the wheels 69 and 70 and is concentric with the axis of rotation 18.

The pressure treatment tube drive means furthermore includes a motor indicated generally by 91 located within the chamber 12 below the pressure treatment tube 17, the supporting wall 66, the wheel 70, the clamping wall 82, and the discharge tube 21. The motor 91 includes a shaft 92 whose axis of rotation is parallel with the axis of rotation 18 of the tube 17, and which extends below the double driven gear 90, and the shaft 92 has mounted thereon a double drive gear 93 which is drive connected by a pair of chains 94 with the double driven gear 90.

The pressure treatment tube drive motor 91 and the vacuum pump drive motor 63 are connected through suitable and usual control means not shown with a usual source of electric power.

In the apparatus 10, the discharge tube 21 is preferably provided with screen lining means, in the form of a tubular screen of 10 mesh or finer indicated generally by 95.

As best shown in Fig. 3, the longitudinal axis indicated by the dot-dash line 96 of the feed screw shaft 34 of the feed screw means 33 operating in the pressure treatment tube 17 is angled with respect to the axis of rotation 18.

Similarly, as best shown in Fig. 4, the longitudinal axis indicated by the dot-dash line 97 of the feed screw shaft 42 of the discharge feed screw means 41 operating in the discharge tube 21 is angled with respect to the axis of rotation 18.

The preferred cylindric pressure treatment tube 17 having its longitudinal center axis 19 eccentric with respect to the axis of rotation 18 may otherwise be described as including inner and outer tubular surfaces eccentric with respect to the axis of rotation 18.

The eccentricity of the longitudinal center axis 19 of the pressure treatment tube 17 with respect to the axis of rotation 18, for attaining the purposes of the present improvements, should be $\frac{1}{32}$ inch and upwards, and preferably between the limits $\frac{1}{32}$ inch and 1 inch.

The operation of the improved apparatus 10 will be described by way of example in carrying out the improved methods hereof in the pressure treatment of a semi-porcelain pottery body. The Bolton pug mill 49 through the connection of its discharge tube 50 with the connecting tube 27 and the intake tube 20, and the seal mounting of the tubes 27 and 20 by the annular sealing plate 24 across the intake opening 13 on the end wall 11—1 of the pressure chamber 12, constitute plastic material input column forming and feeding means associated with the intake opening 13.

Similarly, the discharge tube 21, the feed screw means 41 operating therein, the plug seal and die unit 53 connected with the outer end of the discharge tube 21, and the seal mounting of the annular sealing plate 45 supporting the discharge tube 21 across the discharge opening 14 on the end wall 11—2 of the gas sealed chamber 12, constitute plastic material output column forming and feeding means associated with the discharge opening 14.

The plastic material input column forming and feeding means associated with the intake opening and the plastic material output column forming and feeding means associated with the discharge opening seal the interior of the chamber 12 from the atmosphere about the exterior thereof.

The pressure treatment tube 17 is rotated so that its inner tubular surface has a relatively great peripheral speed. For example with an 8 inch internal diameter of the pressure treatment tube 17, it has been found that a rotary speed of 90 R. P. M. for the pressure treatment tube 17 is very satisfactory in the treatment of semi-porcelain pottery clay body material.

A tubular plastic material input column enters the pressure treatment tube 17 from the discharge end of the intake tube 20. The stationary feed screw means 33 in cooperation with the rotating pressure treatment tube 17 constitute feed means operative for moving pieces of material from the input column lengthwise along the inner surface of the rotating pressure treatment tube 17 to the output column forming and feeding means at the intake end of the discharge tube 21. The speed of rotation of the pressure treatment tube 17 is sufficiently great to produce a substantial centrifugal action upon the material passing therethrough causing the pieces of material to arrange themselves in an elongated rotating tubular formation for substantially the whole length of the pressure treatment tube 17.

This elongated rotating tubular formation whose length is thus substantially greater than its diameter is effected by centrifugal pressure of the pieces of material against the inner surface of the rotating tube 17, and rotation of the tubular formation of the pieces of material with the tube 17.

The action of the feed screw means 33 in combination with the rotating pressure treatment tube 17 is such as to simultaneously move the pieces of material in the tubular formation lengthwise of the tubular formation whereby the successive applications of the centrifugal pressures tend to reduce one or more dimensions of the pieces of material in the tube 17 by flattening and breaking.

Simultaneously the mass of the gas in the gas sealed chamber 12 is moved by operation of the vacuum pump 60 so that the moving gas contacts with the inner tubular faces of the pieces of material in the tubular formation so that the gas content of the pieces of material is changed to the extent that substantially all of the voids of the material have a gas density approaching the gas density of the gas sealed chamber, which in the vacuum or de-airing treatment of a semi-porcelain pottery clay body is desired to be that density coinciding with a vacuum of substantially 27 inches of mercury or more.

The intake tube 20 and the discharge tube 21 are cylindric and concentric with the axis of rotation 18. Accordingly the eccentric tubular surfaces of the intake end of the pressure treatment tube 17 telescoped over the discharge end of the intake tube 20 produces a constantly varying clearance between the telescoped ends of the tube on any particular radial plane. This action in conjunction with the external helix thread 22 on the intake tube 20 serves to keep constantly clear the clearance space for gas passage between the telescoped ends of the tubes 20 and 17 and at the same time serves as a blocking means preventing the escape of pieces of material through the space between the telescoped ends of the tubes 17 and 20 into the gas sealed chamber 12.

A similar material blocking and clearing action is provided by the eccentrically rotating telescoped discharge end of the tube 17 operating within the intake end of the discharge tube 21, in association with the helix thread 23 on the discharge end of the tube 17.

As the tubular formation of material advances from the discharge end of the pressure treatment tube 17 into the discharge tube 21, it loses its rotary velocity imparted to it by the rotating tube 17 and is moved in a spiral course finally becoming substantially a straight line in the discharge tube 21 by the action of the feed screw means 41 rotating with the pressure treatment tube 17.

The material in the discharge tube 21 tends to occupy a variable portion of the volume of the space between the inner surface of the stationary discharge tube 21 and the rotating feed screw shaft 42 and blades 44 in accordance with the resistance to discharge.

There is practically always a residual gas content substantially uniformly distributed through a mass of plastic ceramic material formed from pieces which have been subject to a vacuum treatment of as great as that of a vacuum of 27 inches of mercury or more.

Any working of such treated plastic ceramic material, as by the blades and shaft of a feed screw, serves to redistribute and re-entrap the residual gas content and form undesirable seams and pockets in the output column of the plastic material.

Both the eccentricity and the angling of the shaft 42 of the feed screw means 41 with respect to the axis of rotation 18 serve to form in the inner end of the output column an enlarged bore and clearance spaces between the shaft 42 and the blades 44 which are exposed through the space between the telescoped end of the tubes 21 and 17 to the action of the moving gas mass in the chamber 12. The opening formed by the eccentricity and angle of the shaft is caused to remain open for the communication of gases to the chamber 12 by the viscosity of the plastic material by virtue of which these openings caused by eccentricity are not closed until communication has been effected.

The material passing through the apparatus 10 may be otherwise described as being subject to one stage of de-airing treatment in the pressure treatment tube 17, and to a second stage of de-airing treatment in the discharge tube 21.

As a result, the output column of plastic material issuing from the discharge die 56 has a residual gas content which is substantially less than that obtained by other usual de-airing apparatus.

Conversely, the material in the output column of the improved apparatus 10 has a plasticity which is substantially greater than that obtained by other usual apparatus.

The tubular formation of the pieces of material in the pressure treatment tube 17 during the operation of the apparatus 10 preferably occupy only about 10% of the total free volume of the tube, insuring a maximum exposure of the voids of the material to the action of the moving gas mass in the chamber 12.

In the operation of the improved apparatus 10, there is no clogging of the chamber 12 since the clearance spaces between the telescoped tube ends of the apparatus are kept open and at the same time material is prevented from escaping from the tubes into the chamber 12.

Consequently, the improved apparatus 10 may be operated substantially indefinitely without danger of clogging. A thirty day run of one of the improved apparatus 10 in a commercial semi-porcelain pottery manufacturing plant produces no perceptible clogging or deposit of material in the chamber 12.

By contrast usual de-airing apparatus in a commercial semi-porcelain pottery have their vacuum chambers clogged very frequently, requiring shut down and cleaning out as often sometimes as twice a day, and always every thirty days.

The use of the screen lining means 95 in the discharge tube 21 serves to prevent backing up of material in the discharge tube.

In Fig. 8 a second embodiment of the improved apparatus is indicated generally by 110 and is identical with the apparatus 10 with the exception that in the pressure treatment tube 117 of the apparatus 110 there is also provided a tubular lining screen 198 for use in connection with any material which may tend to back up in the tube 117.

The eccentricity and angling of the shaft 34 of the feed screw means 33 serves to constantly maintain an open clearance space in any material which may tend to pack together at the discharge end of the pressure treatment tube 17.

The embodiments of the present inprovements illustrated and described herein are by way of example, and the scope of the present invention is not limited to the same or to the particular details thereof, but is commensurate with any and all novel subject matter contained herein which may at any time properly under the United States patent laws be set forth in the claims hereof or originating herein, and the elements of any such claims are intended to include their reasonable functional and structural equivalents.

I claim:

1. In the pressure treatment of material for changing the gas content thereof and the like, the method steps including introducing pieces of the material into a rotating tube within a gas sealed chamber, causing the pieces of material to arrange themselves in an elongated rotating tubular formation whose length is substantially greater than its diameter by centrifugal pressure against the inner surface of the rotating tube, simultaneously moving the pieces of material in the tubular formation lengthwise of the tubular formation whereby the application of the centrifugal pressure tends to reduce one or more dimensions of the pieces of material by flattening, and simultaneously moving a mass of gas in the gas sealed chamber and in the tube and in contact with the inner tubular faces of the pieces of material in the tubular formation to change the gas content of the pieces of material to the extent that substantially all of the voids in the material have a gas density approaching the gas density of the gas in the sealed chamber.

2. In the pressure treatment of material for changing the gas content thereof and the like, the method steps including introducing pieces of the material into an eccentrically rotating tube within a gas sealed chamber, causing the pieces of material to arrange themselves in an elongated eccentrically rotating tubular formation whose length is substantially greater than its diameter by centrifugal pressure against the inner surface of the eccentrically rotating tube, simultaneously moving the pieces of material in the tubular formation lengthwise of the tubular formation whereby the application of the centrifugal pressure tends to reduce one or more dimensions of the pieces of material by flattening, and simultaneously moving a mass of gas in the gas sealed chamber and in the tube and in contact with the inner tubular faces of the pieces of material in the tubular formation to change the gas content of the pieces of material to the extent that substantially all of the voids in the material have a gas density approaching the gas density of the gas in the sealed chamber.

3. In the pressure treatment of material, the method steps including introducing a sealing column of plastic material into a gas sealed chamber, forming an elongated bore in the incoming end of the column, causing pieces of material from the column to arrange themselves in a rotating tubular formation, simultaneously moving the pieces of material in the tubular formation lengthwise of the tubular formation, forming a sealing discharge column from the pieces of material of the tubular formation, and forming an elongated bore in the inner end of the discharge column exposed to the gas in the chamber.

4. In the pressure treatment of material, the method steps including moving pieces of material in a gas sealed chamber, forming a sealing discharge column from the pieces of material, and forming an elongated bore in the inner end of the discharge column, and opening the material of the discharge column about the bore to exposure to the gas in the chamber.

5. In apparatus for the pressure treatment of material for changing the gas content thereof and the like, walls forming a gas sealed chamber having an intake opening and a discharge opening, means associated with the intake opening and means associated with the discharge opening for sealing the interior of the chamber from the atmosphere about the exterior thereof, means for controlling the gas density and pressure within the gas sealed chamber and for moving the gas mass therein, a pressure treatment tube operatively mounted for rotation in the gas sealed chamber, the pressure treatment tube having a length substantially greater than its diameter and an opening communicaing with the gas sealed chamber, and feed means operative for moving pieces of material lengthwise along the inner surface of the rotating pressure treatment tube.

6. In apparatus for the pressure treatment of material for changing the gas content thereof and the like, walls forming a gas sealed chamber having an intake opening and a discharge opening, means associated with the intake opening and means associated with the discharge opening for sealing the interior of the chamber from the atmosphere about the exterior thereof, means for controlling the gas density and pressure within the gas sealed chamber and for moving the gas mass therein, a pressure treatment tube operative mounted for rotation in the gas sealed chamber, the pressure treatment tube having a length upwards of three times its diameter and an opening communicating with the gas sealed chamber, and feed means operative for moving pieces of material lengthwise along the inner surface of the rotating pressure treatment tube.

7. In apparatus for the pressure treatment of material for changing the gas content thereof and the like, walls forming a gas sealed chamber having an intake opening and a discharge opening, means associated with the intake opening and means associated with the discharge opening for sealing the interior of the chamber from the atmosphere about the exterior thereof, means for controlling the gas density and pressure within the gas sealed chamber and for moving the gas mass therein, a pressure treatment tube operatively mounted for rotation about an axis within the gas sealed chamber, the pressure treatment tube having a length substantially greater than its diameter and having opposite ends with surfaces eccentric with the axis of rotation, an intake tube extending from the intake opening of the chamber towards one end of the pressure treatment tube, a discharge tube extending from the discharge opening of the chamber toward the other end of the pressure treatment tube, adjacent ends of the pressure treatment tube and the intake tube telescoping with each other and adjacent ends of the pressure treatment tube and the discharge tube telescoping with each other, and means operative between the telescoped tube ends in association with the eccentrically rotating end surfaces of the pressure treatment tube for preventing the escape of pieces of material from the tubes into the chamber and the clogging of the space between the telescoped tube ends.

8. In apparatus for the pressure treatment of material for changing the gas content thereof and the like, walls forming a gas sealed chamber having an intake opening and a discharge opening, means associated with the intake opening and means associated with the discharge opening for sealing the interior of the chamber from the atmosphere about the exterior thereof, a pressure treatment tube operatively mounted for rotation about an axis within the gas sealed chamber, the pressure treatment tube having opposite ends with surfaces eccentric with the axis of rotation, an intake tube extending from the intake opening of the chamber towards one end of the pressure treatment tube, a discharge tube extending from the discharge opening of the chamber towards the other end of the pressure treatment tube, adjacent ends of the pressure treatment tube and the intake tube telescoping with each other and adjacent ends of the pressure treatment tube and the discharge tube telescoping with each other, and means operative between the telescoped tube ends in association with the eccentrically rotating end surfaces of the pressure treatment tube for preventing the escape of pieces of material from the tubes into the chamber and the clogging of the space between the telescoped tube ends.

9. In apparatus for the pressure treatment of material and the like, a treatment tube operatively mounted for rotation about an axis, the treatment tube having opposite ends with surfaces eccentric with the axis of rotation, an intake tube extending towards one end of the treatment tube, a discharge tube extending towards the other end of the treatment tube, adjacent ends of the treatment tube and the intake tube telescoping with each other and adjacent ends of the treatment tube and the discharge tube telescoping with each other.

10. In apparatus for the pressure treatment of material and the like, a treatment tube operatively mounted for rotation about an axis, the treatment tube having opposite ends with surfaces eccentric with the axis of rotation, an intake tube extending towards one end of the treatment tube, a discharge tube extending towards the other end of the treatment tube, adjacent ends of the treatment tube and the intake tube telescoping with each other and adjacent ends of the treatment tube and the discharge tube telescoping with each other, and means operative between the telescoped tube ends in association with the eccentrically rotating end surfaces of the treatment tube for preventing the escape of pieces of material from the tubes and the clogging of the space between the telescoped tube ends.

11. In apparatus for the pressure treatment of material for changing the gas content thereof and the like, walls forming a gas sealed chamber having an intake opening and a discharge opening, means associated with the intake opening and means associated with the discharge opening for sealing the interior of the chamber from the atmosphere about the exterior thereof, means for controlling the gas density and pressure within the gas sealed chamber and for moving the gas mass therein, a pressure treatment tube operatively mounted for rotation about an axis within the gas sealed chamber, the pressure treatment tube having a length substantially greater than its diameter and having opposite ends with surfaces eccentric with the axis of rotation, an intake tube extending from the intake opening of the chamber towards one end of the pressure treatment tube, a discharge tube extending from the discharge opening of the chamber towards the other end of the pressure treatment tube, adjacent ends of the pressure treatment tube and the intake tube telescoping with each other and adjacent ends of the pressure treatment tube and the discharge tube telescoping with each other, and means operative between the telescoped tube ends in association with the eccentrically rotating end surfaces of the pressure treatment tube for preventing the escape of pieces of material from the tubes into the chamber and the clogging of the space between the telescoped tube ends, feed means operative for moving pieces of material lengthwise along the inner surface of the rotating pressure treatment tube.

12. In apparatus for the pressure treatment of material for changing the gas content thereof and the like, walls forming a gas sealed chamber having an intake opening and a discharge opening, means associated with the intake opening and means associated with the discharge opening for sealing the interior of the chamber from the atmosphere about the exterior thereof, means for controlling the gas density and pressure within the gas sealed chamber and for moving the gas mass therein, a pressure treatment tube operatively mounted for rotation about an axis within the gas sealed chamber, the pressure treatment tube having a length substantially greater than its diameter and having opposite ends with surfaces eccentric with the axis of rotation, an intake tube extending from the intake opening of the chamber towards one end of the pressure treatment tube, a discharge tube extending from the discharge opening of the chamber towards the other end of the pressure treatment tube, adjacent ends of the pressure treatment tube and the intake tube telescoping with each other and adjacent ends of the pressure treatment tube and the discharge tube telescoping with each other, and means operative between the telescoped tube ends in association with the eccentrically rotating end surfaces of the pressure treatment tube for preventing the escape of pieces of material from the tubes into the chamber and the clogging of the space between the telescoped tube ends, feed means operative for moving pieces of material lengthwise along the inner surface of the rotating pressure treatment tube, and feed screw means rotating with and extending from the pressure treatment tube into the discharge tube.

13. In apparatus for the pressure treatment of plastic material for changing the gas content thereof and the like, walls forming a gas sealed chamber having an intake opening and a discharge opening, plastic material input column forming and feeding means associated with the intake opening and plastic material output column forming means associated with the discharging opening and sealing the interior of the chamber from the atmosphere about the exterior thereof, means for controlling the gas density and pressure within the gas sealing chamber and for moving the gas mass therein, a pressure treatment tube operatively mounted for rotation about an axis within the gas sealed chamber, the pressure treatment tube having a length substantially greater than its diameter and having opposite ends with surfaces eccentric with the axis of rotation, an intake tube extending from the intake opening of the chamber towards one end of the pressure treatment tube, a discharge tube extending from the discharge opening of the chamber towards the other end of the pressure treatment tube, adjacent ends of the pressure treatment tube and the intake tube telescoping with each other and adjacent ends of the pressure treatment tube and the discharge tube telescoping with each other, and means operative between the telescoped tube ends in association with the eccentrically rotating end surfaces of the pressure treatment tube for preventing the escape of pieces of material from the tubes into the chamber and the clogging of the space between the telescoped tube ends, feed screw means extending from the intake tube lengthwise through the rotating pressure treatment tube, and feed screw means rotating with and extending from the pressure treatment tube into the discharge tube, each feed screw means including a shaft which is eccentric with respect to the tube in which it operates.

14. In apparatus for the pressure treatment of plastic material for changing the gas content thereof and the like, walls forming a gas sealed chamber having an intake opening and a discharge opening, plastic material input column forming and feeding means associated with the intake opening and plastic material output column forming means associated with the discharge opening and sealing the interior of the chamber from the atmosphere about the exterior thereof, means for controlling the gas density and pressure within the gas sealing chamber and for moving the gas mass therein, a pressure treatment tube operatively mounted for rotation about an axis within the gas sealed chamber, the pressure treatment tube having a length substantially greater than its diameter and having opposite ends with surfaces eccentric with the axis of rotation, an intake tube extending from the intake opening of the chamber towards one end of the pressure treatment tube, a discharge tube extending from the discharge opening of the chamber towards the other end of the pressure treatment tube, adjacent ends of the pressure treatment tube and the intake tube telescoping with each other and adjacent ends of the pressure treatment tube and the discharge tube telescoping with each other, and means operative between the telescoped tube ends in association with the eccentrically rotating end surfaces of the pressure treatment tube for preventing the escape of pieces of material from the tubes into the chamber and the clogging of the space between the telescoped tube ends, feed screw means extending from the intake tube lengthwise through the rotating pressure treatment tube, and feed screw means rotating with and extending from the pressure treatment tube into the discharge tube, each feed screw means including a shaft which is eccentric with respect to the tube in which it operates, and each shaft having a longitudinal axis which is angled with respect to the longitudinal axis of the tube in which it operates.

15. In apparatus for the pressure treatment of material and the like, a rotary tube arranged for the passage of material therethrough, feed screw means within the tube for feeding material therethrough, the feed screw means including blades having outer peripheries eccentric with the tube.

16. In apparatus for the pressure treatment of material and the like, a tube arranged for the passage of material therethrough, feed screw means within the tube for feeding material therethrough, the feed screw means including a rotary shaft having a longitudinal axis which is angled with respect to its axis of rotation.

17. In apparatus for the pressure treatment of material and the like, a tube arranged for the passage of material therethrough, feed screw means within the tube for feeding material therethrough, the feed screw means including a tapered shaft having a longitudinal axis which is angled with respect to the longitudinal axis of the tube and the tapered shaft having a larger end and a smaller end, and the tube having an intake end and a discharge end, the larger end of the shaft being located at the intake end of the tube.

18. In apparatus for the pressure treatment of material and the like, a tube arranged for the passage of material therethrough, feed screw means within the tube for feeding material therethrough, the feed screw means including a rotary shaft which is eccentric with the tube, and the shaft having a longitudinal axis which is angled with respect to its axis of rotation.

19. In apparatus for the pressure treatment of material and the like, a tube arranged for the passage of material therethrough, feed screw means within the tube for feeding material therethrough, the feed screw means including a rotary tapered shaft which is eccentric with the tube, and the shaft having a longitudinal axis which is angled with respect to its axis of rotation.

20. In apparatus for the pressure treatment of plastic material for changing the gas content thereof and the like, walls forming a gas sealed chamber having an intake opening and a discharge opening, plastic material input column forming and feeding means associated with the intake opening and plastic material output column forming and feeding means associated with the discharge opening and sealing the interior of the chamber from the atmosphere about the exterior thereof, means for controlling the gas density and pressure within the gas sealed chamber and for moving the gas mass therein, a pressure treatment tube operatively mounted for rotation in the gas sealed chamber, the pressure treatment tube having a length substantially greater than its diameter and an opening communicating with the gas sealed chamber, and feed means operative for moving pieces of material from the input column lengthwise along the inner surface of the rotating pressure treatment tube to the output column forming and feeding means.

21. In apparatus for the pressure treatment of plastic material for changing the gas content thereof and the like, walls forming a gas sealed chamber having an intake opening and a discharge opening, plastic material input column forming and feeding means associated with the intake opening and plastic material output column forming and feeding means associated with the discharge opening and sealing the interior of the chamber from the atmosphere about the exterior thereof, means for controlling the gas density and pressure within the gas sealed chamber and for moving the gas mass therein, a pressure treatment tube operatively mounted for rotation about an axis within the gas sealed chamber, the pressure treatment tube having a length substantially greater than its diameter and having surfaces eccentric with the axis of rotation, and feed means operative for moving pieces of material from the input column lengthwise along the inner surface of the rotating pressure treatment tube to the output column forming and feeding means.

22. In apparatus for the pressure treatment of plastic material for changing the gas content thereof and the like, walls forming a gas sealed chamber having an intake opening and a discharge opening, plastic material input column forming and feeding means associated with the intake opening and plastic material output column forming and feeding means associated with the discharge opening and sealing the interior of the chamber from the atmosphere about the exterior thereof, means for controlling the gas density and pressure within the gas sealed chamber and for moving the gas mass therein, a pressure treatment tube operatively mounted for rotation about an axis within the gas sealed chamber, the pressure treatment tube having surfaces eccentric with the axis of rotation, and feed means operative for moving pieces of material from the input column lengthwise along the inner surface of the rotating pressure treatment tube to the output column forming and feeding means.

23. In apparatus for the pressure treatment of material and the like, a treatment tube operatively mounted for rotation about an axis, the treatment tube having opposite ends with surfaces eccentric with the axis of rotation, an intake tube extending towards one end of the treatment tube, a discharge tube extending towards the other end of the treatment tube, adjacent ends of the treatment tube and the intake tube telescoping with each other and adjacent ends of the treatment tube and the discharge tube telescoping with each other, the eccentricity of the end surfaces of the treatment tube with the axis of rotation being over $\frac{1}{32}$ inch.

24. In apparatus for the pressure treatment of material and the like, a treatment tube operatively mounted for rotation about an axis, the treatment tube having opposite ends with surfaces eccentric with the axis of rotation, an intake tube extending towards one end of the treatment tube, a discharge tube extending towards the other end of the treatment tube, adjacent ends of the treatment tube and the intake tube telescoping with each other and adjacent ends of the treatment tube and the discharge tube telescoping with each other, the eccentricity of the end surfaces of the treatment tube with the axis of rotation being upwards of 1 inch.

25. In apparatus for the pressure treatment of material and the like, a treatment tube operatively mounted for rotation about an axis, the treatment tube having opposite ends with surfaces eccentric with the axis of rotation, an intake tube extending towards one end of the treatment tube, a discharge tube extending towards the other end of the treatment tube, adjacent ends of the treatment tube and the intake tube telescoping with each other and adjacent ends of the treatment tube and the discharge tube telescoping with each other, the eccentricity of the end surfaces of the treatment tube with the axis of rotation being between $\frac{1}{32}$ inch and 1 inch.

26. In apparatus for the pressure treatment of plastic material for changing the gas content thereof and the like, walls forming a gas sealed chamber having an intake opening and a discharge opening, plastic material input column forming and feeding means associated with the intake opening and plastic material output column forming means associated with the discharge opening and sealing the interior of the chamber from the atmosphere about the exterior thereof, means for controlling the gas density and pressure within the gas sealing chamber and for moving the gas mass therein, a pressure treatment tube operatively mounted for rotation about an axis within the gas sealed chamber, the input means including an intake tube extending from the intake opening of the chamber towards one end of the pressure treatment tube, the output means including a discharge tube extending from the discharge opening of the chamber towards the other end of the pressure treatment tube, adjacent ends of the pressure treatment tube and the intake tube telescoping with each other and adjacent ends of the pressure treatment tube and the discharge tube telescoping with each other, means operative between the telescoped tube ends for preventing the escape of pieces of material from the tubes into the chamber and the clogging of the space between the telescoped tube ends, the discharge tube having a tubular screen lining, feed screw means extending from the intake tube lengthwise through the rotating pressure treatment tube, and feed screw means rotating with and extending from the pressure treatment tube into the discharge tube.

27. In apparatus for the pressure treatment of plastic material for changing the gas content thereof and the like, walls forming a gas sealed chamber having an intake opening and a discharge opening, plastic material input column forming and feeding means associated with the intake opening and plastic material output column forming means associated with the discharge opening and sealing the interior of the chamber from the atmosphere about the exterior thereof, means for controlling the gas density and pressure within the gas sealing chamber and for moving the gas mass therein, a pressure treatment tube operatively mounted for rotation about an axis within the gas sealed chamber, the input means including an intake tube extending from the intake opening of the chamber towards one end of the pressure treatment tube, the output means including a discharge tube extending from the discharge opening of the chamber towards the other end of the pressure treatment tube, adjacent ends of the pressure treatment tube and the intake tube telescoping with each other and adjacent ends of the pressure treatment tube and the discharge tube telescoping with each other, means operative between the telescoped tube ends for preventing the escape of pieces of material from the tubes into the chamber and the clogging of the space between the telescoped tube ends, the pressure treatment tube having a tubular screen lining and the discharge tube having a tubular screen lining, feed screw means extending from the intake tube lengthwise through the rotating pressure treatment tube, and feed screw means rotating with and extending from the pressure treatment tube into the discharge tube.

28. In apparatus for the pressure treatment of plastic materials and the like, a tube arranged for passage of material therethrough, a tubular screen lining within the tube, and feed screw means within the tube for feeding material therethrough.

29. In apparatus for the pressure treatment of plastic material and the like, a tube arranged for passage of material therethrough, screen lining means within the tube, and feed screw means within the tube for feeding material therethrough.

30. In apparatus for the pressure treatment of material for changing the gas content thereof and the like, walls forming a gas sealed chamber having an intake opening and a discharge opening, material input means associated with the intake opening and material output means associated with the discharge opening and sealing the interior of the chamber from the atmosphere about the exterior thereof, means for controlling the gas density within the gas sealing chamber and for moving the gas mass therein, a pressure treatment tube within the gas sealed chamber, the pressure treatment tube having surfaces eccentric with respect to a longitudinal axis, means operatively mounting the pressure treatment tube for rotation about the longitudinal eccentric axis, the input means including an intake tube extending from the intake opening of the chamber towards one end of the pressure treatment tube, the output means including a discharge tube extending from the discharge opening of the chamber toward the other end of the pressure treatment tube, adjacent ends of the pressure treatment tube and the intake tube telescoping with each other and adjacent ends of the pressure treatment tube and the discharge tube telescoping with each other.

31. In apparatus for the treatment of material, a treatment tube, the treatment tube having surfaces eccentric with respect to a longitudinal axis, means operatively mounting the treatment tube for rotation about the longitudinal eccentric axis, the feed means operative for moving pieces of the material lengthwise through the rotating treatment tube.

32. In apparatus for the treatment of material, a treatment tube, the treatment tube having surfaces eccentric with respect to a longitudinal axis, means operatively mounting the treatment tube for rotation about the longitudinal eccentric axis, an intake tube extending toward one end of the treatment tube, a discharge tube extending towards the other end of the treatment tube, adjacent ends of the treatment tube and the intake tube telescoping with each other and adjacent ends of the treatment tube and the discharge tube telescoping with each other.

33. In apparatus for the treatment of material, a treatment tube, the treatment tube having surfaces eccentric with respect to a longitudinal axis, means operatively mounting the treatment tube for rotation about the longitudinal eccentric axis, an intake tube extending towards one end of the treatment tube, a discharge tube extending towards the other end of the treatment tube, adjacent ends of the treatment tube and the intake tube telescoping with other and adjacent ends of the treatment tube and the discharge tube telescoping with each other, and feed means operative for moving pieces of material through the tubes.

ELWIN A. HAWK.